(12) United States Patent
Li et al.

(10) Patent No.: US 8,289,856 B2
(45) Date of Patent: Oct. 16, 2012

(54) ALARM THRESHOLD FOR BGP FLAPPING DETECTION

(75) Inventors: Wen-Jui Li, Bridgewater, NJ (US);
Sanjini George, Edison, NJ (US);
Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 267 days.

(21) Appl. No.: 12/845,382

(22) Filed: Jul. 28, 2010

(65) Prior Publication Data

US 2012/0030523 A1    Feb. 2, 2012

(51) Int. Cl.
*H04L 12/26* (2006.01)
(52) U.S. Cl. ........................................... 370/244
(58) Field of Classification Search .................. 370/244
See application file for complete search history.

(56) References Cited

U.S. PATENT DOCUMENTS

| | | | |
|---|---|---|---|
| 2004/0160969 A1* | 8/2004 | Moon et al. | 370/401 |
| 2005/0050176 A1* | 3/2005 | Ilnicki et al. | 709/220 |
| 2009/0180480 A1* | 7/2009 | Hilt et al. | 370/395.21 |
| 2010/0124170 A1* | 5/2010 | Xu et al. | 370/242 |
| 2011/0231704 A1* | 9/2011 | Ge et al. | 714/26 |
| 2011/0238843 A1* | 9/2011 | Pan et al. | 709/227 |

OTHER PUBLICATIONS

Villamizar et al., RFC 2439 BGP Route Flap Damping, Nov. 1998, pp. 1-30.*
Wang et al., 'Understanding BGP Session Failures in a Large ISP', May 2007, 9 pages.*

* cited by examiner

*Primary Examiner* — Melvin Marcelo (57) ABSTRACT

Methods and systems are described that improve the alarming logic for Border Gateway Protocol (BGP) flapping events. Embodiments provide an alarm threshold on BGP flapping conditions and alert on BGP related events. A reduction in silent failures and network outage minutes is achieved.

18 Claims, 6 Drawing Sheets

ALARM THRESHOLD FOR BGP FLAPPING DETECTION

BACKGROUND OF THE INVENTION

The invention relates generally to monitoring an internetwork consisting of multiple networks joined by routers. More specifically, the invention relates to methods and systems that monitor route flapping.

Border Gateway Protocol (BGP) is a gateway protocol that can be used on the Internet to provide loop-free routing within a single Autonomous System (AS) (internal BGP (iBGP)) or between different ASs (external BGP (eBGP)). The Internet consists of independently administered networks connected by routers to form a single internetwork AS. ASs are smaller internetworks and contain routers that exchange routing information with each other using various Interior Gateway Protocols (IGPs) such as Routing Information Protocol (RIP) and Interior Gateway Routing Protocol (IGRP). These IGPs do not scale well enough to handle the exchange of routing information between border routers that join various ASs together.

To exchange routing information between the border routers, Exterior Gateway Protocols (EGPs) are used such as BGP. Like RIP and IGRP, BGP is based on distance-vector or path-vector routing algorithms which enables groups of routers to share their routing information in an efficient and scalable manner.

The routing information BGP exchanges between border routers is called Network Layer Reachability Information (NLRI), and specifies which other AS's data can be forwarded to from the local AS and the most efficient routes (best path) for doing this.

One problem condition that may occur with dynamic routers on large internetworks is route flapping. When a router is flapping, it broadcasts routing table updates that alternate between two different routes to a host. For example, the flapping router may indicate during the first broadcast that route A is the best route to a given host, indicate during the second broadcast that route B is the best route, indicate during the following broadcast that route A is best, and so on. Flapping routers generate unnecessary routing traffic over the network. This generally happens when a router is unnecessarily configured to load balance between paths with equal hop counts. Routes that flap frequently are usually not reliable to send traffic to. If routes flap frequently, the load on all Internet routes increase. To determine whether a router is flapping, a network fault management system is used to analyze the received alerts from all routers in the network to determine the problems.

Route flapping is joined with interface flapping, where an interface on a router has a hardware failure that will cause the router to announce a route alternately as "up" and "down." Route flapping may also be caused by hardware errors, software errors, configuration errors, intermittent errors in communications links, unreliable connections, and others, within the network which cause certain reachability information to be repeatedly advertised and withdrawn.

In networks where a link-state routing protocol is run, route flapping will force frequent recalculation of the topology by all participating routers. In networks where a distance-vectoring routing protocol is run, route flapping can trigger routing updates with every state change. In both cases, route flapping prevents a network from converging.

A state of convergence is achieved once all routing protocol-specific information has been distributed to all routers participating in the routing protocol process. Any change in the network that affects routing tables will break the convergence temporarily until this change has been successfully communicated to all other routers. Convergence time is a measure of how fast a group of routers reach the state of convergence. It is one of the main design goals and an important performance indicator for routing protocols to implement a mechanism that allows all routers running this protocol to quickly and reliably converge.

Certain configuration and hardware conditions will prevent a network from ever converging. For instance, a flapping interface may cause conflicting information to propagate the network so that routers never agree on its current state. Under certain circumstances it might even be desired to withhold routing information from parts of the network, thereby enforcing an unconverged network.

Route flapping alarms used today may cause many network outages to go undetected. If a route flapping alarm threshold is set too low, false positives may result. If a route flapping alarm threshold is set too high, intermittent conditions requiring action may be missed or responsiveness may be reduced.

The logic used to determine a route flapping condition between a local and peer router is built upon one session. What is needed is a method and system that improves route flapping alarm logic by combining information across multiple links (multiple pairs of local and peer routers) to eliminate false positives.

SUMMARY OF THE INVENTION

The inventors have discovered that it would be desirable to have methods and systems that improve the alarm logic for BGP route flapping events. Embodiments provide an alarm threshold on BGP route flapping conditions and alert on fault impacting BGP session establishment. A reduction in silent failures and network outage minutes is achieved.

One aspect of the invention provides a method for generating multiple BGP session flapping alarms for routers deployed in an Autonomous System (AS) network. Methods according to this aspect of the invention include receiving a BGP session "down" alarm at a first router from a second router in the AS network, starting a session "up" count for the BGP session between the first and second routers and starting a flap time period P, if a BGP session "up" alarm is received by the first router from the second router within the flap time period P, starting a flapping count for the first router with one flap registered and starting a predetermined flapping time period Q, counting every flap the first router experiences with each router that the first router has a link with in the AS network, and comparing the flap count to a predetermined alarm threshold N, wherein N is a number of flaps, and if the first router experiences N number of flaps from all first router BGP sessions within the flapping time period Q, generating a multiple session flapping alarm for the first router.

Another aspect of the invention further includes defining a time period R, and if a high CPU utilization alarm is received from the first router within R after generating a multiple session flapping alarm for the first router, generating a high CPU utilization alarm for the first router.

Another aspect of the invention further includes if a BGP session "up" alarm from the first router for the BGP session with the second router is not received within the flap time period P, indicating that the BGP session between the first and second routers is down.

Another aspect of the invention further includes if the first router does not experience N number of flaps from all first router BGP sessions within the flapping time period Q, resetting the flapping time period Q to zero and resetting the flapping count to zero until the next BGP session "down" alarm between the first router and another router the first router is having a session with.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks and a computer-usable medium storing computer-readable instructions that provide an alarm threshold on multiple session BGP route flapping conditions. The invention may be deployed as software as an application program tangibly embodied on a program storage device. The application code for execution can reside on a plurality of different types of computer readable media known to those skilled in the art.

In situations where a router's CPU utilization is high or one or more of the router's line cards have failed, BGP sessions may have been dropped or there may have been flapping BGP sessions.

Currently, BGP flapping alarms are based on a single session. For example, for a router A to a router B session. When there are multiple flaps (one BGP session down alarm followed by an up alarm within short duration is counted as one flap) on a single session, a BGP flapping alarm is generated. When this occurs, a BGP flapping trouble ticket is generated by a network fault management system.

Embodiments vary the alarm threshold in order to capture events which go undetected. Embodiments observe information from multiple router sessions rather than a single session. This ensures that fault conditions uncovered by single session logics can be detected by multiple session methodology.

Embodiments observe multiple BGP route flapping sessions instead of observing an individual session that flaps continuously for a period of time. For example, if one router has a total of five sessions within a 10 minute time period, if all five different link sessions flap, a BGP flapping alarm is generated.

Figure 1:
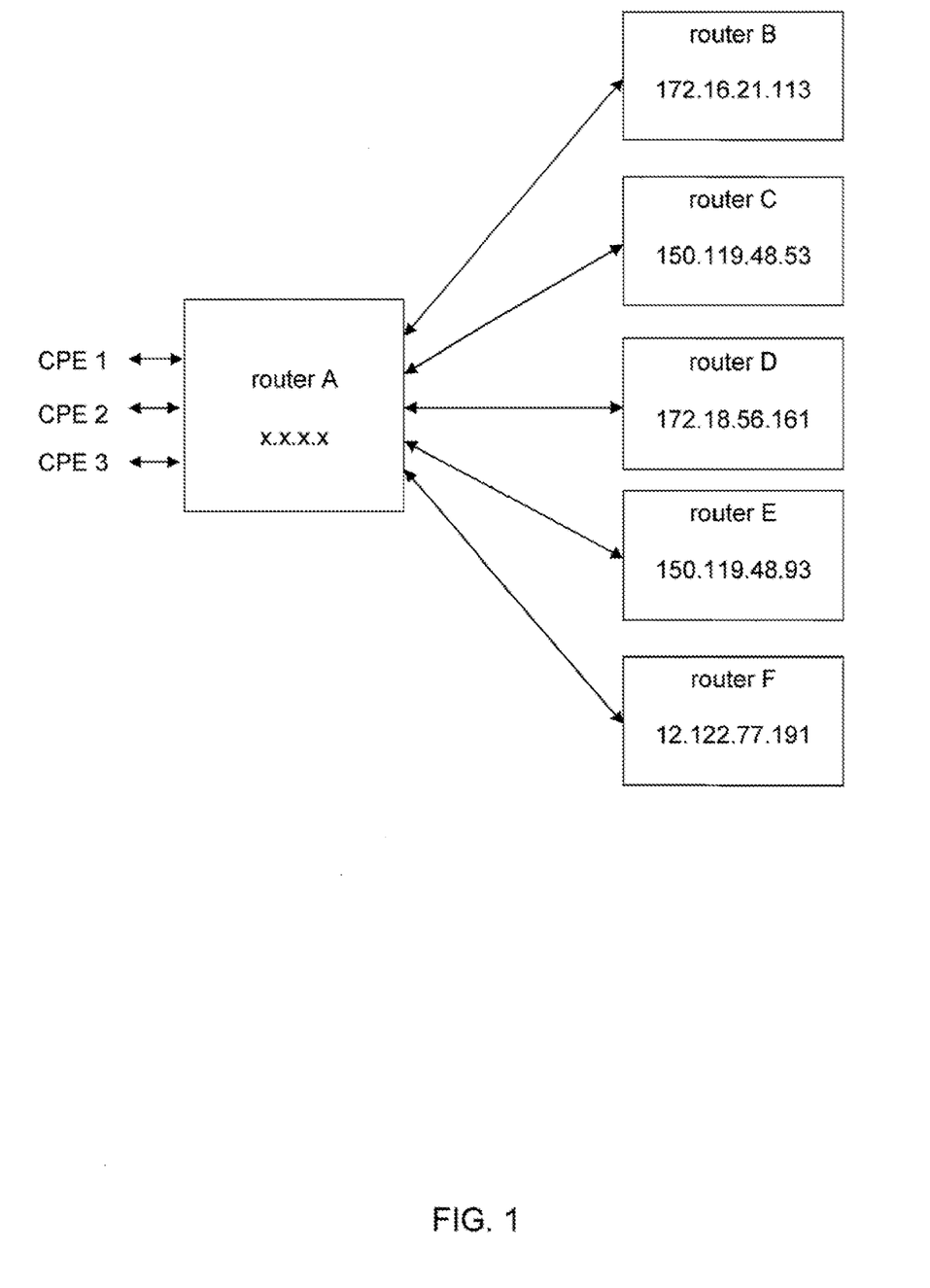
FIG. 1 is an exemplary router (router A) showing Customer Premises Equipment (CPE) and Internet Protocol (IP) addresses assigned to its interfaces.

FIG. 1 shows routers A, B, C, D, E and F employed in an AS network with three Customer Premises Equipment (CPE) addresses and five Internet Protocol (IP) addresses assigned. Router A may contain many IP link addresses interfacing to CPE and other routers, and may have multiple sessions with routers B (A,B), C (A,C) D (A,D), E (A,E) and F (A,F).

Figure 2:
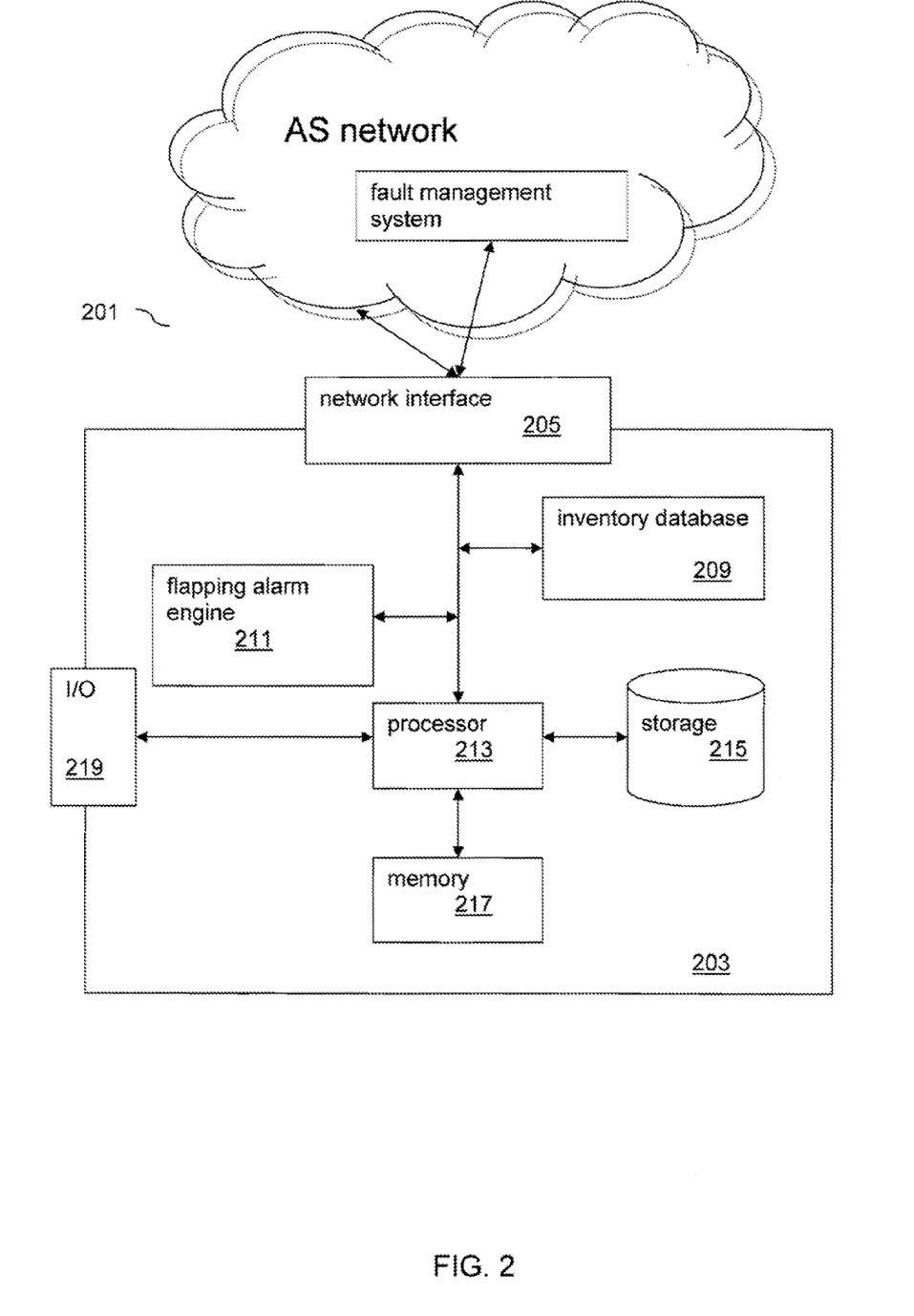
FIG. 2 is an exemplary alarm threshold system framework for BGP route flapping detection.
Figure 3:
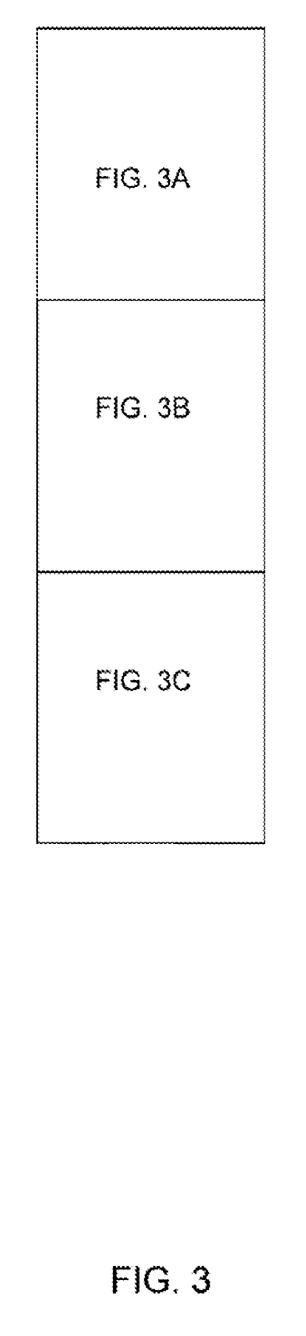
FIG. 3 is an exemplary method.
Figure 3A:
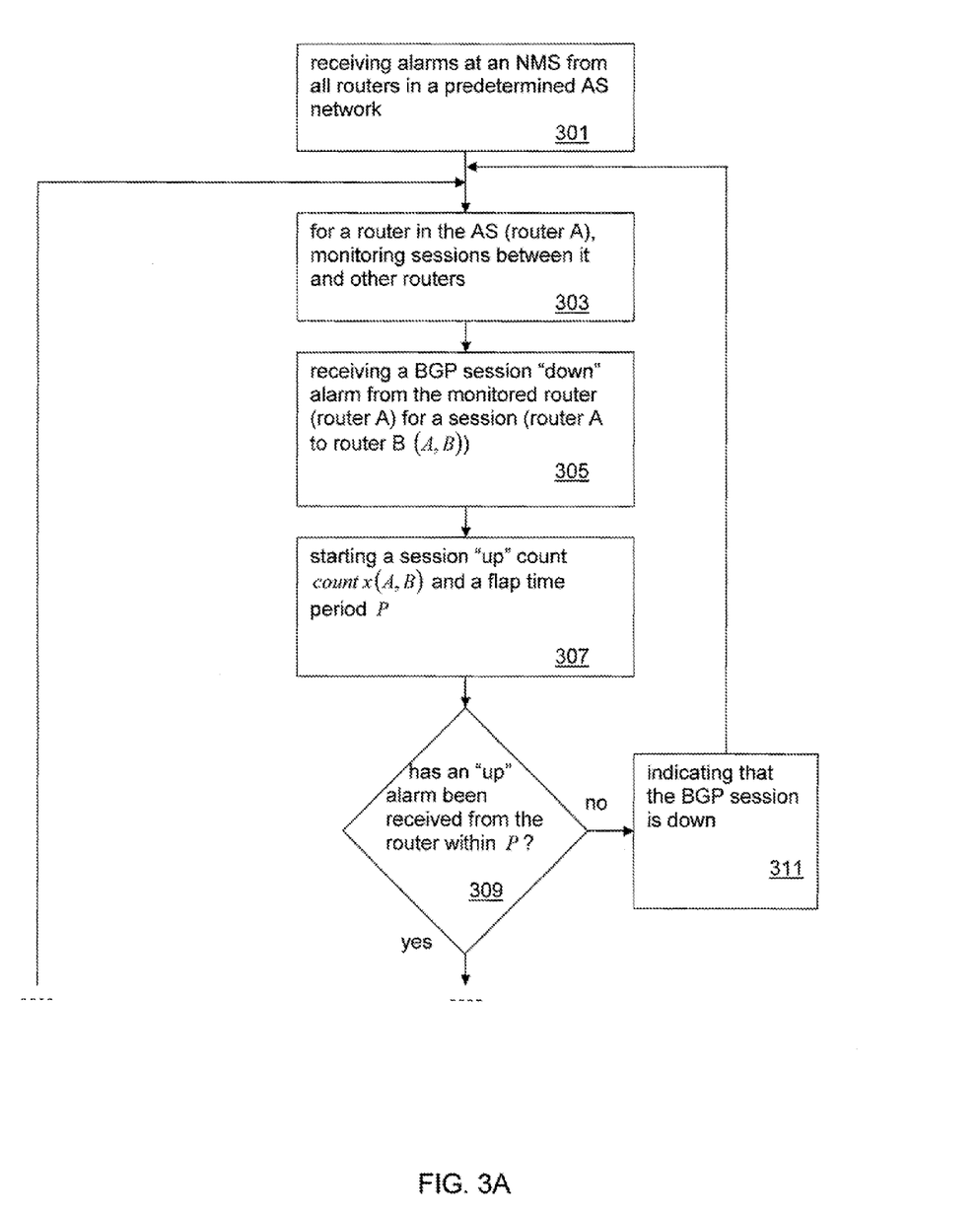
Figure 3B:
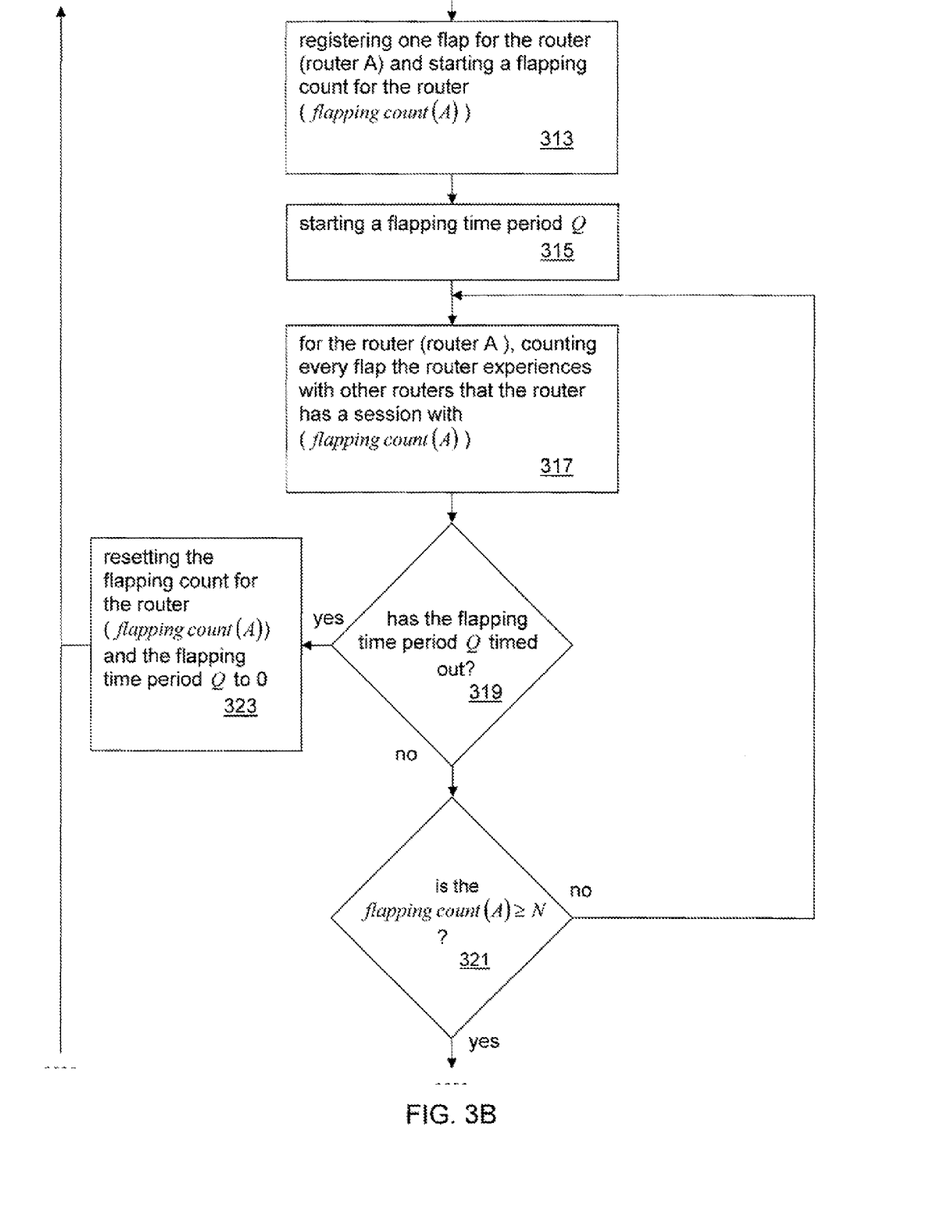
Figure 3C:
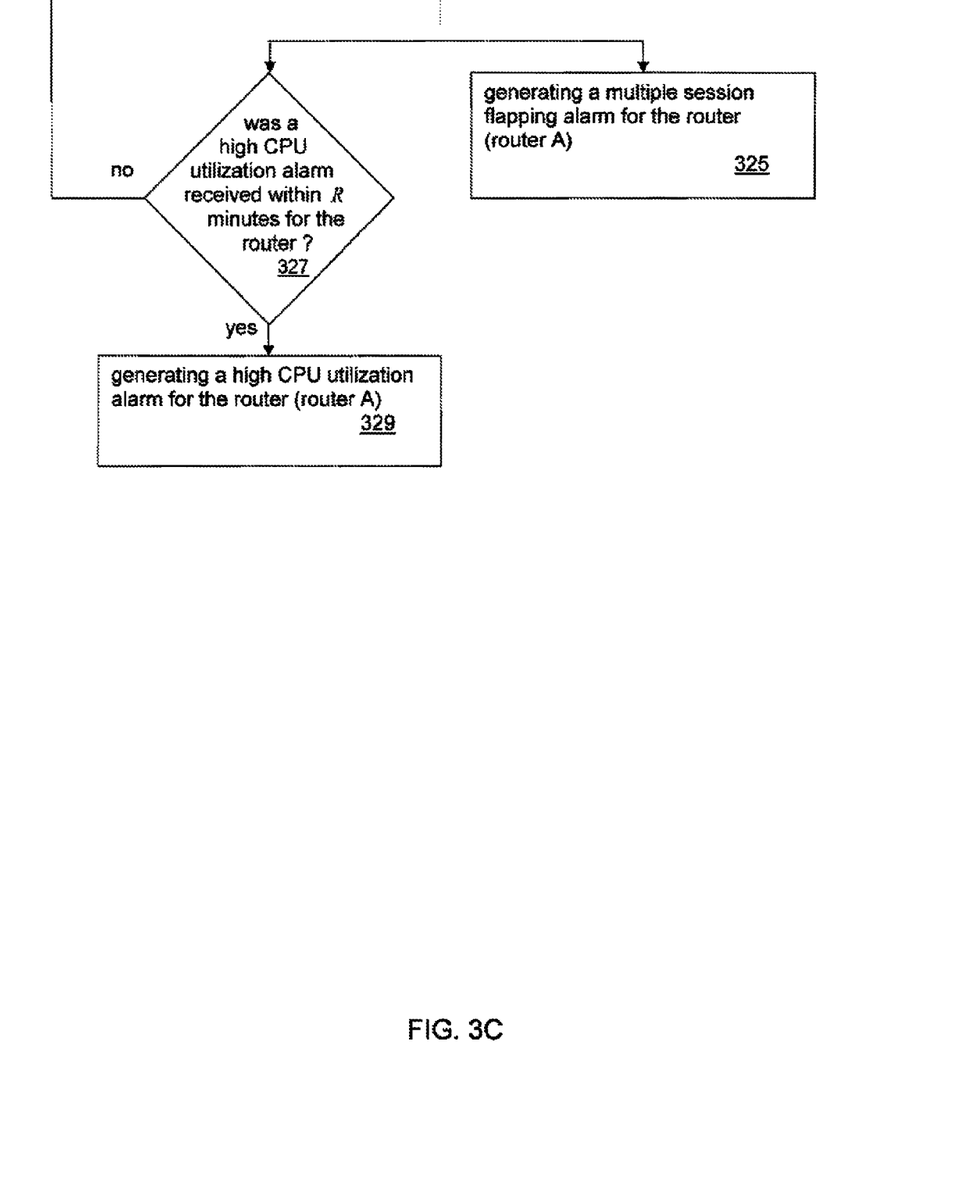

FIG. 2 shows an embodiment of a system 201 framework 203. FIG. 3 shows a method for a BGP route flapping alarm threshold according to one embodiment addressing route flapping problems in networks such as shown in FIG. 1.

The framework 203 may be a part of a Network Management System (NMS), a part of the NMS server, or standalone, and includes a network interface 205 coupled to an AS network/fault management system and configured to acquire network topology information, network reachability information, as well as network status information to perform network management services. One function the NMS performs is event management where the NMS receives events, both internal and external, via Simple Network Management Protocol (SNMP) traps from all routers. A trap is a form of an alarm sent from each router in the network to the NMS continuously. Traps may be of several types such as BGP down, BGP up, router CPU utilization high, router CPU utilization low, and others. The data obtained forms the bases for correlation which in turn determines router flapping problems and potential root causes. The network interface 205 is coupled to a network manager/inventory database 209, a flapping alarm engine 211 and a processor 213. The processor 213 is coupled to storage 215, memory 217 and I/O 219.

The framework 203 stores acquired network flow data into the data store 215. The framework 203 may be implemented as a computer including a processor 213, memory 217, storage devices 215, software and other components. The processor 213 is coupled to the network interface 205, I/O 219, storage 215 and memory 217 and controls the overall operation of the computer by executing instructions defining the configuration. The instructions may be stored in the storage device 215, for example, a magnetic disk, and loaded into the memory 217 when executing the configuration. The invention may be implemented as an application defined by the computer program instructions stored in the memory 217 and/or storage 215 and controlled by the processor 213 executing the computer program instructions. The computer also includes at least one network interface 205 coupled to and communicating with a network such as shown in FIG. 1 to interrogate and receive network configuration data. The I/O 219 allows for user interaction with the computer via peripheral devices such as a display, a keyboard, a pointing device, and others.

FIG. 3 shows a method that reduces, outage minutes, detects BGP route flapping and from multiple session flapping, performs trace back to conditions such as high router CPU utilization and router line card failures.

Routers normally experience CPU utilization that may increase and then decrease many times. Therefore, to capture a router experiencing high CPU utilization is difficult. If the CPU utilization threshold limit is set too high, a high CPU utilization may be missed. On the other hand, setting a CPU utilization limit too low may trigger false alarms.

For a router, embodiments combine multiple session BGP flapping alarms with a CPU utilization alarm to detect CPU utilization problems. The alarms are collected during real production outages. When a router's CPU experiences a problem, it may impact BGP processing more widely—multiple sessions versus a single session. Single session BGP problems tend to be local.

For a predefined AS network, all alarm types from routers deployed in the AS network are received by the framework 203/NMS (step 301). A router A to router B session (A,B) is unique from a router B to router A session (B,A). The method is taught monitoring a router having sessions with one or more other routers. For example, router A may have sessions with one or more other routers B, C, D, E and F. Similarly, the method applies to each of the other routers B, C, D, E and F and their sessions.

A router A session down/up count count x(A,_) is performed to monitor for router A flaps with other routers (B, C, D, E and F). For example, a router A to router B session (A,B) down/up count count x(A,B) for flaps (step 303). The router B to router A session down/up count count x(B,A) is unique to router B and applies when the method monitors router B.

A BGP session is a semi-permanent peer-to-peer communication between two routers. For example, the pair of logical connections between router A and router B. During a session, two routers send each other hello messages independently. Afterwards, each router waits for the hello message to return (round trip) to determine if the session is up or down. When one router does not receive the confirmation, the "down" trap will be generated from the router that sent the message and did not receive a reply, and vice versa.

A BGP session "down" alarm between two routers, for example, an alarm message from router A for the router A to router B session (A,B) is received by the NMS (step 305). Upon receipt of the "down" alarm, a session "up" count x(A,B) is started and a predetermined flap time period P is started, where P is a time period starting from when the session down alarm was received for the session (step 307). In one embodiment, P may be 60 seconds.

If a BGP session "up" alarm from router A is not received within the flap time period P, the router A to router B BGP session (A,B) is determined to be down (steps 309, 311). For a given session direction (A,B), one flap is a BGP session "down" alarm followed by a BGP session "up" alarm.

If a BGP session "up" alarm for the router A to router B BGP session (A,B) is received within the flap time period P, a flapping count for router A flapping count(A) is started with one flap registered flapping count(A)=1 (for the router A to router B BGP session (A,B)) and a predetermined flapping time period Q is started (steps 313, 315). In one embodiment, Q may be 10 minutes. flapping count(A) counts every flap router A experiences with each router that router A has a BGP session with in the predetermined flapping time period Q. For example, router A may also have BGP sessions with router C (A,C) and router D (A,D) and others (step 317).

flapping count(A) counts every flap router A experiences with each router that router A has a session with and compares the count flapping count(A) to a predetermined alarm threshold N, where N is a number of flaps. If router A does not experience N number of flaps from all router A BGP sessions flapping count(A)<N within the flapping time period Q, the flapping time period Q is reset to zero and flapping count(A) is reset to zero until the next BGP session "down" alarm between router A and a router router A is having a session with (steps 319, 321, 317, 323).

If router A does experience N number of flaps from all router A BGP sessions flapping count(A)≧N within the flapping time period Q, a multiple session flapping alarm is generated for router A (steps 319, 321, 325).

If a high CPU utilization alarm is received within a predetermined time period R from when the multiple session flapping alarm was generated for router A, a high CPU utilization alarm is generated for router A (steps 327, 329). In one embodiment, R may be 5 minutes.

Embodiments perform two counts, 1) a count-per-session (link level) (count x(A,B)) and 2) a flap count-per-router flapping count(A). For example, if router A has BGP sessions with router B and router C and a first flap (a down alarm followed by an up alarm within the flap time period P) is experienced between router A and router B count x(A,B) (count-per-session), flapping count(A)=1 and the flapping time period Q is started. If within the flapping time period Q two flaps are experienced in BGP sessions with router C and three flaps are experienced in BGP sessions with router F, flapping count(A)=6. During flapping time period Q, flapping count(A) is constantly compared with the alarm threshold N. If flapping count(A) equals N (or greater) within the flapping time period Q, a multiple session flapping alarm is generated for router A. If the flapping time period Q times out (expires) and flapping count(A) is less than N, the flapping time period Q is reset to zero and flapping count(A) is reset to zero until the next BG? session "down" alarm between router A and a router router A is having a session with.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for generating multiple BGP session flapping alarms for routers deployed in an Autonomous System (AS) network comprising:
    receiving a BGP session "down" alarm at a first router from a second router in the AS network;
    starting a session "up" count for the BGP session between the first and second routers and starting a flap time period P;
    if a BGP session "up" alarm is received by the first router from the second router within the flap time period P, starting a flapping count for the first router with one flap registered and starting a predetermined flapping time period Q;
    counting every flap the first router experiences with each router that the first router has a link with in the AS network; and
    comparing the flap count to a predetermined alarm threshold N, wherein N is a number of flaps, and if the first router experiences N number of flaps from all first router BGP sessions within the flapping time period Q, generating a multiple session flapping alarm for the first router.

2. The method according to claim 1 further comprising:
    defining a time period R; and
    if a high CPU utilization alarm is received from the first router within R after generating a multiple session flapping alarm for the first router, generating a high CPU utilization alarm for the first router.

3. The method according to claim 1 further comprising if a BGP session "up" alarm from the first router for the BGP session with the second router is not received within the flap time period P, indicating that the BGP session between the first and second routers is down.

4. The method according to claim 1 further comprising if the first router does not experience N number of flaps from all first router BGP sessions within the flapping time period Q, resetting the flapping time period Q to zero and resetting the flapping count to zero until the next BGP session "down" alarm between the first router and another router the first router is having a session with.

5. The method according to claim 1 wherein alarms generated from the AS network routers are received by a Network Management System (NMS).

6. The method according to claim 1 wherein alarms generated from the AS network routers are received by an alarm threshold system framework for BGP route flapping detection.

7. The method according to claim 1 wherein P is 60 seconds.

8. The method according to claim 1 wherein Q is 10 minutes.

9. The method according to claim 2 wherein R is 5 minutes.

10. A system for generating multiple BGP session flapping alarms for routers deployed in an Autonomous System (AS) network comprising:
means for receiving a BGP session "down" alarm at a first router from a second router in the AS network;
means for starting a session "up" count for the BGP session between the first and second routers and means for starting a flap time period P;
if a BGP session "up" alarm is received by the first router from the second router within the flap time period P, means for starting a flapping count for the first router with one flap registered and means for starting a predetermined flapping time period Q;
means for counting every flap the first router experiences with each router that the first router has a link with in the AS network; and
means for comparing the flap count to a predetermined alarm threshold N, wherein N is a number of flaps, and if the first router experiences N number of flaps from all first router BGP sessions within the flapping time period Q, means for generating a multiple session flapping alarm for the first router.

11. The system according to claim 10 further comprising:
means for defining a time period R; and
if a high CPU utilization alarm is received from the first router within R after generating a multiple session flapping alarm for the first router, means for generating a high CPU utilization alarm for the first router.

12. The system according to claim 10 further comprising if a BGP session "up" alarm from the first router for the BGP session with the second router is not received within the flap time period P, means for indicating that the BGP session between the first and second routers is down.

13. The system according to claim 10 further comprising if the first router does not experience N number of flaps from all first router BGP sessions within the flapping time period Q, means for resetting the flapping time period Q to zero and means for resetting the flapping count to zero until the next BGP session "down" alarm between the first router and another router the first router is having a session with.

14. The system according to claim 10 wherein alarms generated from the AS network routers are received by a Network Management System (NMS).

15. The system according to claim 10 wherein alarms generated from the AS network routers are received by an alarm threshold system framework for BGP route flapping detection.

16. The system according to claim 10 wherein P is 60 seconds.

17. The system according to claim 10 wherein Q is 10 minutes.

18. The system according to claim 11 wherein R is 5 minutes.

* * * * *